United States Patent
Assenmacher et al.

(10) Patent No.: US 11,461,455 B2
(45) Date of Patent: Oct. 4, 2022

(54) METHOD AND SYSTEM OF SECURE CONFIGURATION OF AT LEAST ONE ELECTRONIC DEVICE

(71) Applicant: Cryptowerk Corp., Redwood City, CA (US)

(72) Inventors: Holger Assenmacher, Las Vegas, NV (US); Thomas Dienwiebel, Los Gatos, CA (US)

(73) Assignee: CRYPTOWERK CORP., Redwood City, CA (US)

( * ) Notice: Subject to any disclaimer, the term of this patent is extended or adjusted under 35 U.S.C. 154(b) by 332 days.

(21) Appl. No.: 16/632,136

(22) PCT Filed: Jul. 16, 2018

(86) PCT No.: PCT/US2018/042278
§ 371 (c)(1),
(2) Date: Jan. 17, 2020

(87) PCT Pub. No.: WO2019/018282
PCT Pub. Date: Jan. 24, 2019

(65) Prior Publication Data
US 2020/0233950 A1     Jul. 23, 2020

Related U.S. Application Data

(60) Provisional application No. 62/533,562, filed on Jul. 17, 2017.

(51) Int. Cl.
*G06F 21/00*     (2013.01)
*H04L 29/06*     (2006.01)
(Continued)

(52) U.S. Cl.
CPC .......... *G06F 21/44* (2013.01); *G06F 9/44505* (2013.01); *H04L 9/3239* (2013.01)

(58) Field of Classification Search
CPC ..... G06F 9/44505; G06F 21/44; H04L 9/3239
See application file for complete search history.

(56) References Cited

U.S. PATENT DOCUMENTS

| | | | |
|---|---|---|---|
| 10,305,694 B2 * | 5/2019 | Dix | ........................ H04L 9/3239 |
| 2016/0261690 A1 | 1/2016 | Sasaki et al. | .................. 700/194 |

(Continued)

FOREIGN PATENT DOCUMENTS

| | | | |
|---|---|---|---|
| CN | 106796524 A | 5/2017 | ............. G01F 11/14 |
| WO | 2017/090041 A1 | 6/2017 | ............. G06F 21/62 |
| WO | 2019/018282 A1 | 1/2019 | ............. G06F 12/14 |

OTHER PUBLICATIONS

International Search Report and Written Opinion, Application No. PCT/US2018/042278, 9 pages, dated Jul. 16, 2018.

(Continued)

*Primary Examiner* — Philip J Chea
*Assistant Examiner* — Rodman Alexander Mahmoudi
(74) *Attorney, Agent, or Firm* — Slayden Grubert Beard PLLC

(57) ABSTRACT

The present invention relates to the secure configuration of electronic devices, such as for example network-connected "smart" devices and appliances, collectively referred to as "IoT devices". A computer-implemented method of secure configuration of at least one electronic device is provided. According to the method, the electronic device connects to a blockchain database; determines from said blockchain database a configuration block comprising block identification data, where the block identification data corresponds to device identification data, stored with the electronic device; obtains configuration information from said configuration block; and using the configuration information, conducts configuration of the electronic device.

21 Claims, 7 Drawing Sheets

(51) Int. Cl.
*G06F 21/44* (2013.01)
*G06F 9/445* (2018.01)
*H04L 9/32* (2006.01)

(56) References Cited

U.S. PATENT DOCUMENTS

| | | | |
|---|---|---|---|
| 2016/0261685 A1 | 9/2016 | Chen et al. | 709/204 |
| 2017/0091756 A1 | 3/2017 | Stern et al. | 705/39 |
| 2018/0374173 A1* | 12/2018 | Chen | G06F 9/466 |
| 2019/0190720 A1* | 6/2019 | Falk | H04L 9/3236 |
| 2019/0280856 A1* | 9/2019 | Yeap | G06Q 50/184 |

OTHER PUBLICATIONS

Swan, Melanie, "Blockchain: Blueprint for a New Economy," O'Reilly, ISBN: 978-1-4919-2049-7, XP055279098, 149 Pages, Feb. 8, 2015.
Extended European Search Report, Application No. 18835566.3, 6 pages, dated Jan. 14, 2021.

* cited by examiner

METHOD AND SYSTEM OF SECURE CONFIGURATION OF AT LEAST ONE ELECTRONIC DEVICE

CROSS-REFERENCE TO RELATED APPLICATIONS

This application is a U.S. National Stage Application of International Application No. PCT/US2018/042278 filed Jul. 16, 2018, which designates the United States of America, and claims priority to U.S. Provisional Application No. 62/533,562 filed Jul. 17, 2017, the contents of which are hereby incorporated by reference in their entirety.

TECHNICAL FIELD

The presented invention relates to the secure configuration of electronic devices, such as for example network-connected "smart" devices and appliances, collectively referred to as "IoT devices".

SUMMARY

IoT devices are being used increasingly in commercial and residential environments, such as for example in media, environmental monitoring, infrastructure management, manufacturing, agriculture, energy management, medical/healthcare, building and home automation, transportation, and others.

An intrinsic issue of all network-connected computing devices, such as computers and servers, but also nowadays including IoT devices, relates to security. As recent cyber-attacks have shown, malware and ransomware is present that can infect a large number of computers within hours. With the rise of IoT devices, it is expected that such cyberattacks will also extend to this type of connected device. In this context, the high number of IoT devices, expected to be installed in the near future and the limiting computing power of typical IoT devices provide challenges.

Accordingly, an object exists to enable secure configuration and/or secure reconfiguration of electronic devices and in particular network-connected "smart" or "IoT" devices.

In one aspect of the present invention, a computer-implemented method of secure configuration of at least one electronic device is provided. According to the method, the electronic device connects to a blockchain database; determines from said blockchain database a configuration block comprising block identification data, where the block identification data corresponds to device identification data, stored with the electronic device; obtains configuration information from said configuration block; and using the configuration information, conducting configuration of the electronic device.

According to another aspect of the present invention, an electronic device is provided, comprising a network interface for connecting to a communications network and comprising a processing device, connected with the network interface for communicating with at least one blockchain database. According to this aspect, the processing device is configured for connecting to the blockchain database; determining from said blockchain database a configuration block comprising block identification data, where the block identification data corresponds to device identification data, stored with the electronic device; obtaining configuration information from said configuration block; and using the configuration information, configuring the electronic device.

These and other aspects of the invention will be apparent from and elucidated with reference to the embodiments described hereinafter. Reference is also made to the enclosed dependent claims, which describe further embodiments.

DETAILED DESCRIPTION OF EMBODIMENTS

Figure 1:
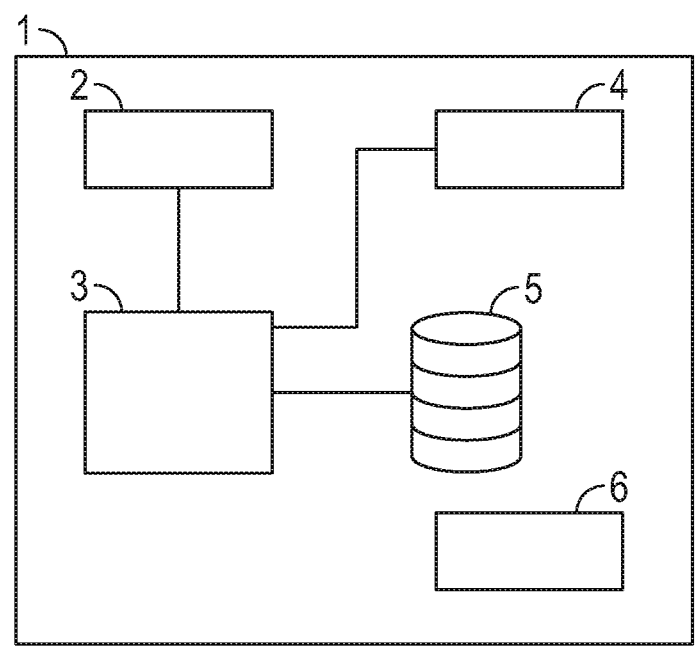
FIG. 1 shows a schematic drawing of an embodiment of an exemplary electronic device according to the invention.

Technical features described in this application can be used to construct various embodiments of electronic devices and methods of secure configuration of at least one electronic device according to the preceding and following description. Some embodiments of the invention are discussed so as to enable one skilled in the art to make and use the invention.

In the following explanation of the present invention according to the embodiments described, the terms "connects", "connected to" or "connected with" are used to indicate a data connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a connection may be provided over a WAN (wide area network), LAN (local area network), or PAN (personal area network), comprising, e.g., the Internet, Ethernet networks, Wi-Fi-networks, and cellular networks. A connection may also be provided using the Bluetooth (low energy) protocol, ZigBee protocol, Z-Wave protocol, Wi-Fi protocol and/or other home automation network protocols.

According to a first exemplary aspect, a computer-implemented method of secure configuration of at least one electronic device is provided, wherein the electronic device connects to a blockchain database; determines from said blockchain database a configuration block comprising block identification data, where the block identification data corresponds to device identification data, stored with the electronic device; obtains configuration information from said configuration block; and using the configuration information, conducting configuration of the electronic device.

In the context of the present invention, we refer to a blockchain as having a plurality of (data) blocks, where each block comprises at least information (payload), and a link to a previous block. The link provides that, once a first block and a second subsequent block is recorded in the database, the information in the first block cannot be altered retroactively without the alteration of the second block and all eventual subsequent blocks. Certainly, according to typical blockchain technology, the first "genesis" block does not require a link.

The link may in an embodiment be a cryptographic link, typically also depending on the contents of the referred block itself, such as a cryptographic hash of the previous block, for example using a one-way function (e.g. MD5, SHA-3, SHA-2, SHA-1, BLAKE, BLAKE2). The blockchain certainly and in corresponding embodiments may comprise further elements. For example, each block of the blockchain database may comprise a time stamp.

In the context of the present invention, the term blockchain database may refer to the following setups, where (1) information is stored as payload in the blocks of the blockchain itself and/or (2) information is stored by any conventional means outside of the blockchain and in addition has a reference to an entry of the blockchain, for instance, by hashing the information and putting a corresponding hash into the blockchain or by providing a chain or tree of hashes in which a path leads from the hash of the information to the final hash in the blockchain.

According to the above first exemplary aspect, the electronic device connects to a blockchain database. Such connection may be established over a suitable data connection, such as discussed in the preceding. A connection may be established by the electronic device, the blockchain database, or another device in according embodiments. All of these options are summarized herein under the wording that the electronic device "connects to" the blockchain database.

Once connected, the electronic device determines a configuration block from the blockchain database. In the present context, the configuration block is a block of the blockchain database that comprises block identification data where the comprised block identification data corresponds to device identification data, stored with the electronic device. Various subroutines may be used to determine the configuration block from the blockchain database, embodiments of which are discussed in the following description and claims. The device identification data may in an embodiment be predefined, e.g., during manufacturing. In another embodiment, the device identification data may be set by a user of the electronic device. Both procedures provide the benefit of being able to produce identical devices without necessarily requiring to embed individualized tags like unique identifiers or device addresses.

The electronic device then obtains configuration information from the configuration block, i.e., stored in the configuration block in a corresponding embodiment. Then, the electronic device conducts configuration, e.g., a configuration subroutine. For example, the electronic device during configuration may configure components, such as a network interface, an I/O interface, a user interface, a processing device, or any other suitable component. Alternatively or additionally, the electronic device may set device parameters, such as for example network parameters, security parameters, operations parameters, or any other suitable parameter.

The configuration information may be of any suitable type to allow the electronic device to conduct configuration.

In one embodiment, the configuration information comprises a configuration script or a link to a storage location of a configuration script. In an additional embodiment, the configuration script is executed by the electronic device to facilitate configuration. In terms of the present invention, a "configuration script" comprises data that allows configuration of the electronic device. The configuration script/data may be of any suitable type. In one additional or alternative embodiment, the device may create or receive an individual device identifier in the process.

In another alternative or additional embodiment, the configuration information comprises an operating software or a link to a storage location of an operating software. In an additional embodiment, the operating software is obtained (in the case of a link) and installed in suitable memory of the electronic device.

In another alternative or additional embodiment, the configuration information comprises a firmware or a link to a storage location of a firmware. In an additional embodiment, the firmware is obtained (in the case of a link) and installed in memory the electronic device. In one example, the firmware is "flashed".

In another alternative or additional embodiment, the configuration information comprises a software update or a link to a storage location of a software update. In an additional embodiment, the software update is obtained (in the case of a link) and installed in suitable memory of the electronic device.

In another alternative or additional embodiment, the configuration information comprises a configuration update or a link to a storage location of a configuration update. In an additional embodiment, the configuration update is obtained (in the case of a link) and installed in suitable memory of the electronic device.

Reference will now be made to the drawings in which the various elements of embodiments will be given numerical designations and in which further embodiments will be discussed.

Specific references to components, process steps, and other elements are not intended to be limiting. Further, it is understood that like parts bear like reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a schematic illustration of an embodiment of an exemplary electronic device 1 according to the invention. The electronic device 1 in this embodiment is an IoT (Internet of Things) device, and more precisely a network-connected camera. The electronic device 1 comprises a network interface 2 for connecting to a communications network 10 (not shown in FIG. 1), which in this embodiment is provided to communicate using the Wi-Fi (IEEE 802.11) protocol. The electronic device 1 further comprises a processing device 3, a camera module 4, and internal memory 5.

The processing device 3 in this embodiment comprises a microcontroller having a suitable microprocessor for processing the images, obtained by camera module 4. The microcontroller may be provided as an ASIC (application specific integrated circuit) in a further embodiment. Camera module 4 provides video (image) data to processing device 3 for transmission to a server or user device over network interface 3. Memory 5 serves as temporary cache for the video data and also to hold configuration settings or software updates, as will be explained in the following.

Electronic device 1 further comprises a PSU 6 (power supply unit), which may be provided for connection to mains (for example the 120V or 240V power grids) and/or may comprise suitable batteries for independent operation. Connections from PSU 6 to the other components of electronic device 1 are not shown to not unnecessarily obscure the present explanation.

Electronic device 1 may certainly in further embodiments comprise additional components, such as a housing, a user interface (display or touchscreen), motors for camera module 4, etc.

The electronic device 1 or more precisely the processing device 3 is pre-configured to conduct a secure configuration procedure—in the following also referred as to "bootstrap"—for initial configuration of the device 1. During the bootstrap procedure, the processing device 3, over the network interface 2 and communications network 10 contacts a blockchain database 11. This is schematically shown in the exemplary system overview of FIG. 2.

Figure 2:
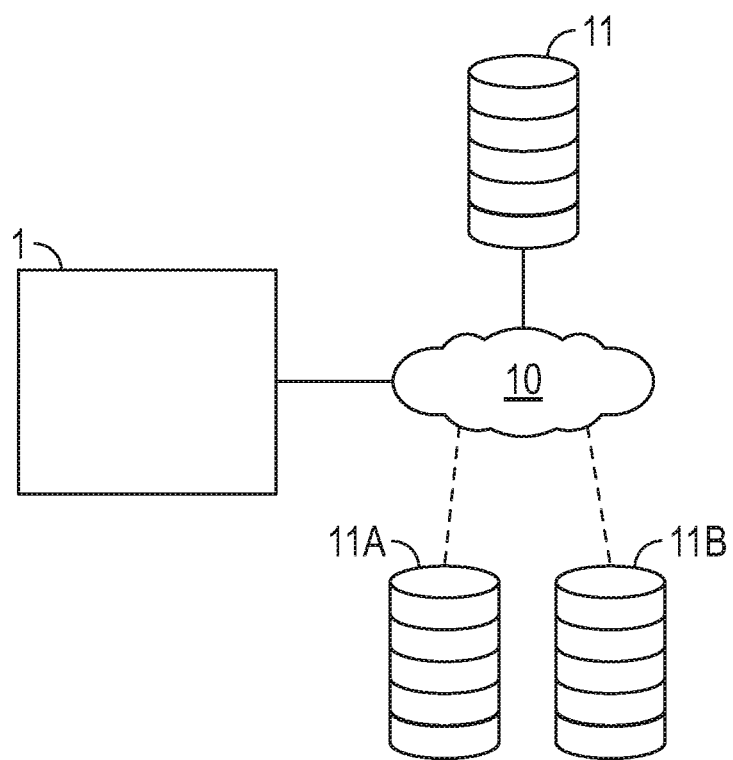
FIG. 2 shows the embodiment of FIG. 1 in an exemplary system overview.

As can be seen from FIG. 2, electronic device 1 contacts blockchain database 11 over communications network 10, the latter of which may in one example be the Internet. Blockchain database 11 is hosted on a suitable server (not shown) as known in the art. The blockchain database 11 is in this example being provided as a distributed blockchain database system, which may comprise further servers (not shown) hosting blockchain databases 11a and 11b, which increases the security of the discussed method and electronic device 1. According to this embodiment, the blockchain database 11 corresponds to the Bitcoin database.

Figure 3:
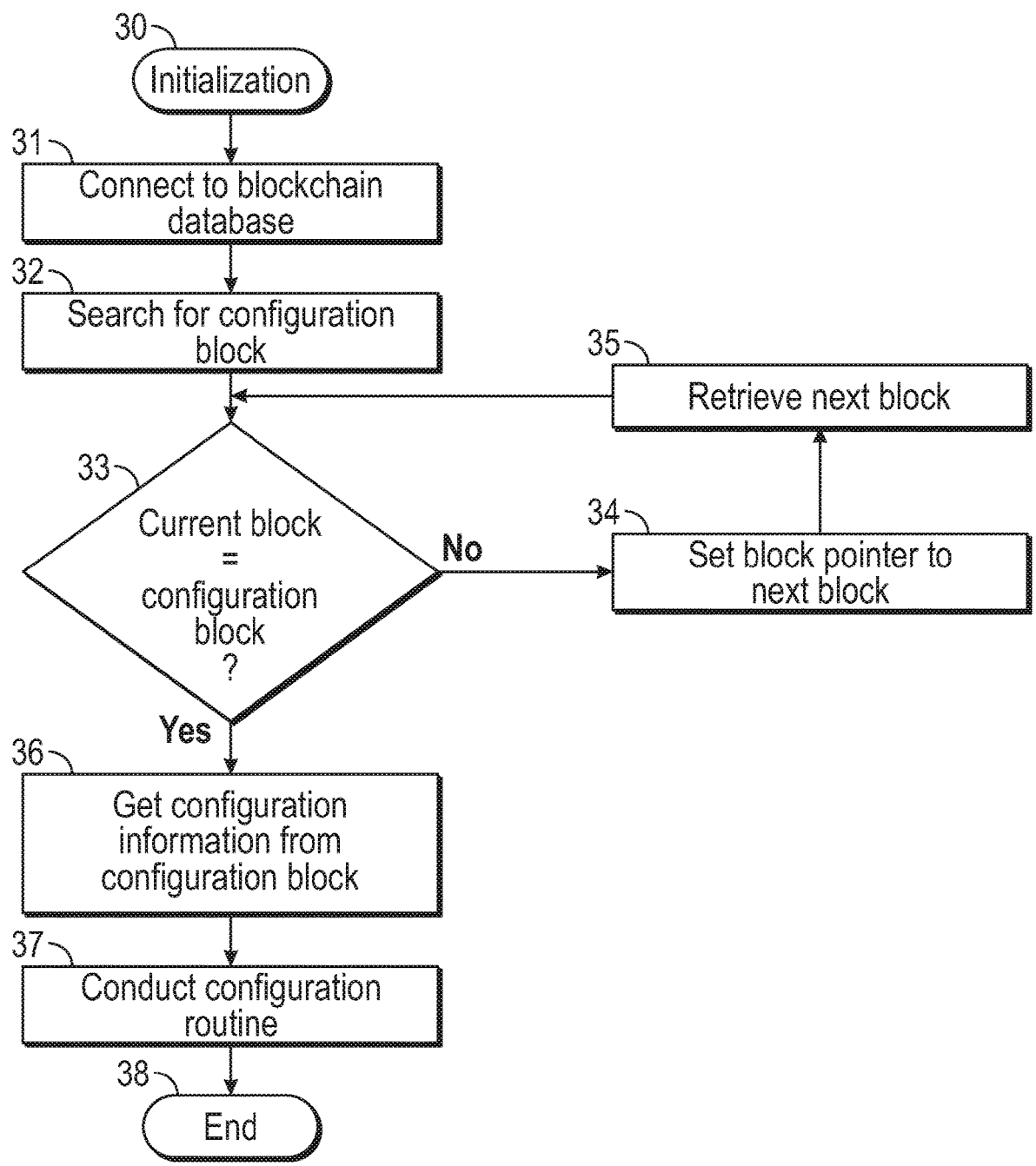
FIG. 3 shows a first embodiment of a computer-implemented method of secure configuration according to the invention in a schematic flow diagram.

FIG. 3 shows a first embodiment of a computer-implemented method of secure configuration according to the invention in a schematic flow diagram.

The operation according to the present embodiment begins in step 30 with the initialization of the electronic device 1, e.g. by powering the device 1 up. The processing device 3 in step 31 contacts blockchain database 11 using network interface 2 over communications network 10. The connection parameters to connect to the Bitcoin blockchain database 11 are pre-defined by the manufacturer in memory 5 of the electronic device 1. The correspondingly contacted instance (e.g. server, cloud service, etc.) is either a blockchain node itself or is provided as a gateway to a blockchain node. The blockchain node may use a peer discovery protocol to initially contact the network of other blockchain nodes. Such a peer discovery protocol typically contacts IP addresses of peers known from its previous run. If that fails, the electronic device 1 may be provided with a list of DNS seed addresses pointing to known nodes and if that fails one or more hardcoded addresses of known stable nodes are used.

Once connected, the processing device 3 in steps 32-35 determines a configuration block from the blockchain database 11. Configuration blocks in this embodiment in general comprise block identification data, allowing to identify the configuration block using a search procedure as discussed in the following, and further comprises configuration information.

The processing device 3 in step 32 begins searching for a configuration block, where the block identification data corresponds to device identification data, stored in memory 5 of the electronic device 1. The device identification data is also pre-defined by the manufacturer of the electronic device 1 and allows to identify the correct configuration block, intended for electronic device 1.

In this embodiment, both, the block identification data and the device identification data are the same random number of a sufficient length, i.e., chosen from a set of numbers big enough to render picking the same number by chance virtually impossible, for instance between 0 and 2 to the power of 512. This number can be determined randomly at electronic device design time and is kept secret for a short period of time (e.g. 15 mins), during which it is put into the blockchain together with its configuration block. Then, one waits until sufficiently many confirmation blocks arrived on top of the block used for configuration (typically about an hour). After that the random number no longer needs to be kept secret. In particular, the electronic devices 1 which are later produced and contain that number do not have to be designed to keep that number secret.

Herein, the processing device 3 searches for the oldest block of the blockchain database 11, where the block identification data corresponds to the device identification data.

In case of multiple electronic device types, models, and/or classes 1, each electronic device class 1 can be programmed with unique device configuration data, allowing to access a similarly unique configuration block. Alternatively, groups of electronic devices 1 can share common device identification data to access the same configuration block and bootstrap procedure, which facilitates a particularly easy manufacture of electronic device 1 since no or less individualization is needed.

According to the present embodiment, the processing device 3 begins searching for the configuration block at a block that corresponds to a minimum block height value, pre-defined in memory 5 of the electronic device. In case the minimum block height value is zero, the processing device 3 begins searching for the configuration block at the genesis block of the blockchain database 11. Otherwise, the search is started at the block of the blockchain database 11 that corresponds to the minimum block height value.

In step 33, the processing device 3 determines, whether the currently checked block is the desired configuration block, i.e., where the block identification data corresponds to the device identification data. If this is not the case and in step 34, a next block pointer, stored in memory 5, is set to the next block, i.e., the following (younger) block of the blockchain database 11. It is noted that the blockchain database 11 is searched in reverse order, i.e., from "older" blocks to "younger" blocks.

In step 35, the block is retrieved from the blockchain database 11, which corresponds to the next block pointer. The operation then proceeds with step 33 and a determination, whether the currently checked block is the desired configuration block as explained in the preceding.

If this is the case and in step 36, the configuration information is obtained from the configuration block. In a simple case, the configuration information is read from the configuration block, which has been obtained from the blockchain database 11 previously. To allow simple obtention of the configuration information, memory 5 of the electronic device 1 comprises a configuration pointer, which points to the configuration information in the configuration block. In one embodiment, the configuration information is concatenated to the block identification data, to simplify storing the configuration information in the blockchain 11.

In step 37, the processing device 3 of the electronic device 1 conducts a configuration (sub)routine using the obtained configuration information from the configuration block.

During the configuration routine, the processing device 3 configures the electronic device 1. Configuring may include one or more of setting of device, security, and network parameters; and download operating software, firmware, software updates, and configuration updates, depending on the specific requirements of the electronic device 1.

According to the present embodiment, the configuration information comprises a configuration script. The configuration script in this embodiment comprises instructions on how to reach a configuration/update server (e.g. a "link") and a public key for encrypted communication with the update server. Usually, the link may be in the form of an IP address.

During the configuration routine, the processing device 3 of electronic device 1 may thus contact the configuration/update sever and first of all check for the latest operating software and/or firmware. If newer software/firmware is available, it will be installed automatically during the configuration routine. Then, configuration settings are retrieved from the configuration/update server or, if configuration settings are already comprised in memory 5 of the electronic device 1, a configuration update is retrieved. The configuration settings/update may comprise, for example, URLs of one or multiple servers to deliver information to, e.g. camera pictures or sensor data. By this, a device might still use conventional methods of data delivery while employing a secure update and configuration mechanism provided by a blockchain.

After successful configuration in step 37, the present method of secure configuration according to the embodiment of FIG. 3 then ends in step 38 and the electronic device 1 switches to an operational mode, in which the intended device operation is provided. In case of the camera, video data from the camera module 4 is provided to a corresponding server or user device, as discussed in the preceding. The method is re-executed in predefined intervals, e.g., every week, to check for software/firmware/configuration updates and thus to re-configure the electronic device 1 if necessary.

Figure 4:
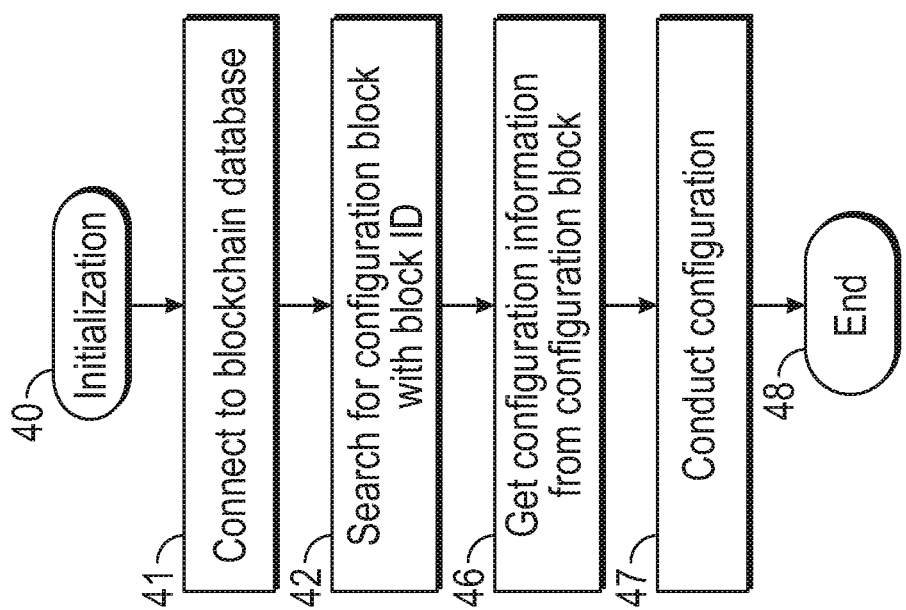
FIG. 4 shows a second embodiment of a computer-implemented method of secure configuration according to the invention in a schematic flow diagram.

FIG. 4 shows a second embodiment of a computer-implemented method of secure configuration according to the invention in a schematic flow diagram. The method according to FIG. 4 corresponds to the embodiment, discussed in the preceding with reference to FIG. 3. Consequently, the reference numerals "4x", i.e., 40-47, refer to the like steps of FIG. 3, i.e., the corresponding "3x" reference numerals 30-38.

As will be apparent from FIG. 4, the inventive method according to the present embodiment corresponds to the embodiment of FIG. 3 with the exception of the determination of the configuration block (steps 32-35 in FIG. 3).

In this embodiment, the device configuration data comprises a block identifier, stored in memory 5. The block identifier unambiguously identifies a certain block of the blockchain database 11 as the configuration block. This simplifies the determination of the configuration block and may be advantageous for electronic devices 1 with limited computing power.

According to this embodiment, the block identifier comprises a time stamp (date/time) of the blockchain database 11. The time stamp may relate to the date/time, the block was written to the blockchain database 11. Consequently, the determination of the configuration block in step 42 comprises querying the blockchain database 11 for the block that corresponds to the block identifier. As will be easily apparent, the time stamp in this embodiment servers as block identification data and device identification data.

Once the configuration block is determined, the configuration information is retrieved in step 46 and the device configuration is conducted in step 47 as discussed in the preceding with reference to steps 36 and 37 of FIG. 3.

Figure 5:
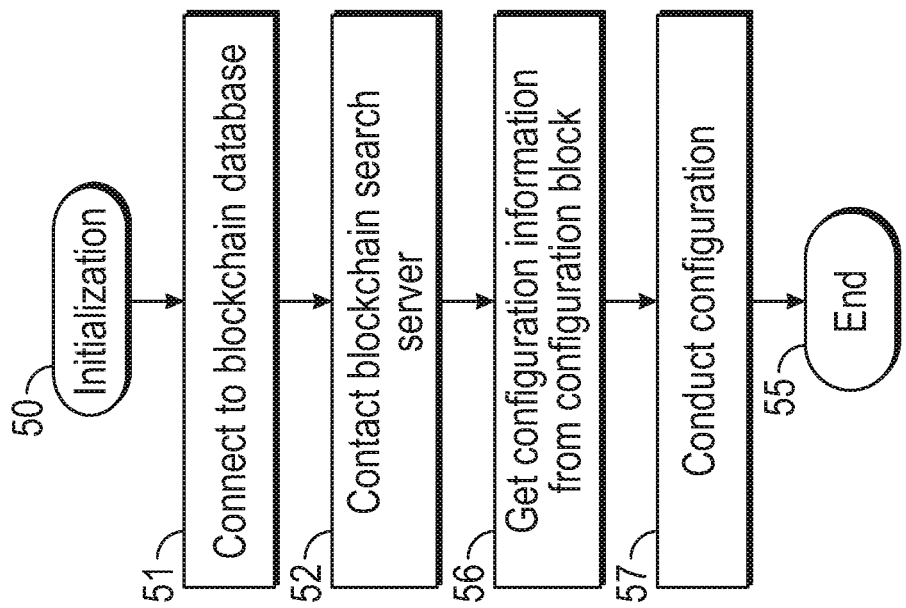
FIG. 5 shows a further embodiment of a computer-implemented method of secure configuration according to the invention in a schematic flow diagram.

FIG. 5 shows a further embodiment of a computer-implemented method of secure configuration according to the invention in a schematic flow diagram. The method according to FIG. 5 corresponds to the embodiment, discussed in the preceding with reference to FIG. 3. Consequently, the reference numerals "5x", i.e., 50-57, refer to the like steps of FIG. 3, i.e., the corresponding "3x" reference numerals 30-38.

As will be apparent from FIG. 5, the inventive method according to the present embodiment corresponds to the embodiment of FIG. 3 with the exception of the determination of the configuration block.

In this embodiment and in step 52, the electronic device 1 contacts a blockchain search server (not shown) to search for the configuration block.

Accordingly, the electronic device in step 52 sends the device identification data and the minimum block height value, if present, to the blockchain search server. The blockchain search server then conducts the steps 33-35 of FIG. 3 until the configuration block is found. As will be easily apparent, the searching thus is "outsourced" in this embodiment, so that it also is advantageous for electronic devices 1 with limited computing power.

Once the blockchain search server has found the configuration block, the latter is provided to the electronic device 1 for obtention of the configuration information in step 56 and the device configuration is conducted in step 57 as discussed in the preceding with reference to steps 36 and 37 of FIG. 3.

In an alternative embodiment, the electronic device 1 also transmits the configuration pointer to the blockchain search server in step 52. Then, the blockchain search server only returns the configuration information to the electronic device 1.

Figure 6A:
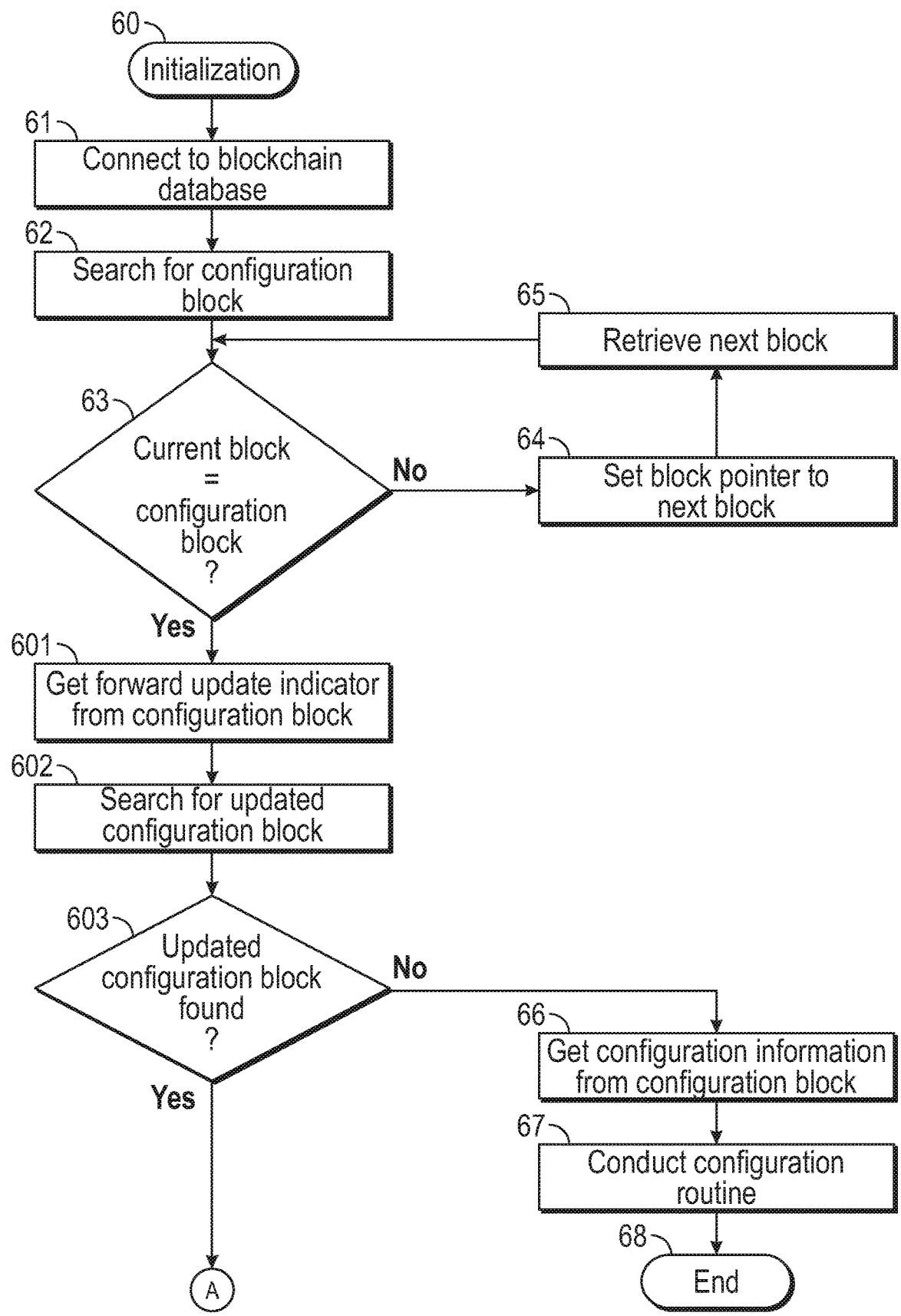
FIGS. 6A and 6B show a further embodiment of a computer-implemented method of secure configuration according to the invention in a schematic flow diagram.
Figure 6B:
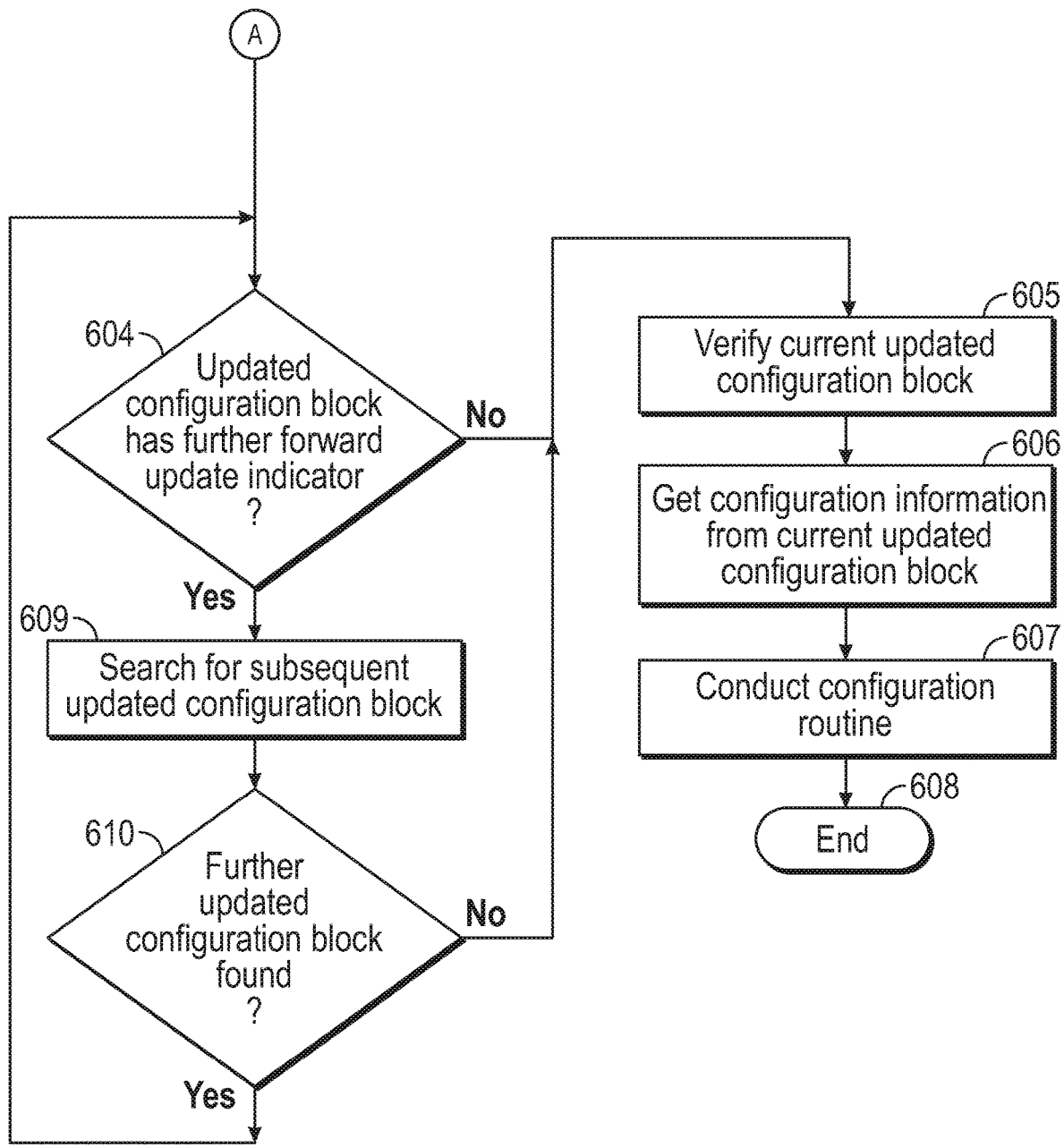

FIGS. 6A and 6B show a further embodiment of a computer-implemented method of secure configuration according to the invention in a schematic flow diagram. The method according to FIG. 6 corresponds to the embodiment, discussed in the preceding with reference to FIG. 3. Consequently, the reference numerals "6x", like in the preceding, refer to the like steps of FIG. 3, i.e., the corresponding "3x" reference numerals 30-38.

The embodiment of FIG. 6 provides a so-called "forward-chained update routine" to allow for secure configuration updates by the manufacturer after the configuration block has been written to the blockchain.

As the instant inventions' inventors have recognized, and due to the inherent resistance of blockchains to modification of data, a particular routine is required to allow the configuration of the electronic device with updated configuration information. Such routine may for example be necessary in case the original configuration information comprises a link to an update server, e.g., "update.iot-device.com", and said domain address should no longer be available.

As will be apparent from FIGS. 6A and 6B, the current embodiment comprises additional steps 601-610. According to this embodiment, the configuration block comprises an additional forward update indicator. The forward update indicator can be regarded as a "chain link" to a new, updated configuration block that is written to the block chain in the future, i.e., after the "initial" configuration block.

In general, the forward update indicator can comprise any suitable data. In this embodiment, the forward update indicator comprises a hash of verification data, such as a suitably long random bit string, the latter of which is kept secret by the device manufacturer until an updated configuration block needs to be written to the blockchain database. The length of the random bit string is chosen long enough to make a brute force attack of enumerating potential candidates that create the same hash value computationally infeasible. By way of example, the verification data comprises a random bit string of 512 bit. The corresponding SHA-2 hash is of a length of 256 bit and is provided as part of the forward update indicator.

According to FIG. 6A and after the determination of the configuration block in step 63, which step and all previous steps correspond to the embodiment of FIG. 3, the electronic device 1 obtains the forward update indicator from the configuration block in step 601. Certainly, and in case no forward update indicator should be present in the configuration block, the method could revert to the procedure of FIG. 3.

In the current embodiment of FIG. 6 and in step 602, the processing device 3 searches for an updated configuration block. The updated configuration block comprises correspondingly updated configuration information, the identical block identification data of the initial configuration block, the discussed verification data, and a further forward update indicator. Accordingly, the processing device 3 in step 602 searches the blockchain database for another configuration block, where the block identification data corresponds to the device identification data. The processing device 3 in this example applies a subroutine in step 602, which corresponds to steps 33-35, explained in the preceding, however using the block height of the initial/original configuration block as minimum block height value, since the updated configuration block cannot be older than the initial/original configuration block.

In step 603 it is determined, whether an updated configuration block was found in step 602. If this is not the case, the configuration information of the initial/original configuration block is obtained in step 66 and the electronic device 1 is configured in step 67 using the configuration information, according to the embodiment of FIG. 3. The method then ends in step 68 and the electronic device 1 switches to an operational mode, in which the intended device operation is provided.

In case the determination in step 603 provides that an updated configuration block was found in step 602, the processing device 3 in step 604 determines, whether the updated configuration block comprises a further forward update indicator. If this is not the case, the current updated configuration block is verified in step 605. The verification will be discussed in detail in the following.

Once the verification is complete, the updated configuration information of the current updated configuration block, i.e., the last updated configuration block, is obtained in step 606. Corresponding to step 67, configuration is then conducted in step 607. Again, the method ends in step 608 and the electronic device 1 switches to an operational mode, in which the intended device operation is provided.

If, in step 604, the processing device 3 determines that the current updated configuration block comprises a further forward update indicator, the processing device 3 in step 609 searches for a further updated configuration block.

Again, the updated configuration block comprises correspondingly updated configuration information, the identical block identification data of the initial and all previous configuration blocks, further verification data, and a further forward update indicator.

Accordingly, the processing device 3 in step 609 searches the blockchain for another updated configuration block, where the block identification data corresponds to the device identification data. The processing device 3 again applies a subroutine, which corresponds to steps 33-35, explained in the preceding, however using the block height of the current updated configuration block as minimum block height value, since any new updated configuration blocks cannot be older than the previous ones.

In case no further updated configuration block exists, the determination in step 610 results in the execution of steps 605-608, as discussed in the preceding using the updated configuration information of the current (last found) updated configuration block. In case a further updated configuration block was determined in step 609, the determination in step 610 provides a positive result and the method continues with step 604.

As will be apparent, the current embodiment provides an iterative procedure to find the most recent, i.e., youngest (updated) configuration block of the blockchain database. When it is found, the electronic device 1 is configured with the (updated) configuration information of the youngest configuration block determined so as to apply the most recent configuration to the electronic device 1.

As discussed in the preceding, the forward update indicator can be regarded as a "chain link" to a new, updated configuration block that is written to the block chain in the future, i.e., after the "initial" configuration block. A particular issue with such forward-chained updated configuration blocks relates to security. Only authorized parties, such as the manufacturer of the electronic device 1, should be able to write valid configuration blocks for electronic device 1 to the blockchain database.

Thus, in the embodiment of FIG. 6, a verification subroutine is conducted in step 605. During the verification, the processing device 3 considers the forward update indicator of the previous configuration block, i.e., the initial/original configuration block or a previous updated configuration block and the verification data, comprised in the current updated configuration block.

For facilitating clarity of the present discussion, in the following, reference is made to an exemplary situation where the initial/original configuration block and one updated configuration block are verified in step 605.

As discussed in the preceding, the forward update indicator of the initial/original configuration block comprises a hash of the verification data, and in this example some randomly chosen bit string. The subsequent updated configuration block comprises this very same bit string. This design allows to verify the integrity of the updated configuration block to assure that the updated configuration block actually originates from the manufacturer of the electronic device 1 or another authorized party. It will be apparent that while it is possible to determine the forward update indicator by hashing the verification data, a determination of the verification data on the basis of knowledge of the forward update indicator generally is impossible, at least when using a robust hash algorithm.

Correspondingly, it is possible to verify the authenticity of the updated configuration block by hashing the verification data provided therein and comparing the result with the hash, provided in the initial/original configuration block. If this is the case, both configuration blocks have the same origin, e.g., the manufacturer, under the assumption that the manufacturer kept the verification data secret until writing the updated configuration block into the blockchain database.

Certainly, after the verification data is public, no further updates are possible using the current verification data while maintaining security. Correspondingly, the updated configuration block again comprises a forward update indicator, which comprises a hash of further verification data, e.g., another (different) random bit string. Using this procedure, it is possible to daisy-chain a plurality of updated configuration blocks in the blockchain database.

Accordingly, in step 605, the processing device 3 first calculates the hash of the verification data comprised in the updated configuration block. Then, the processing device 3 compares the result with the hash, comprised in the forward update indicator. If both hashes match, the configuration information of the current updated configuration block is obtained in step 606. If not, the updated configuration block is discarded in step 608. The method then may proceed to step 609 to find a further updated configuration block (not shown in FIG. 6).

Figure 7A:
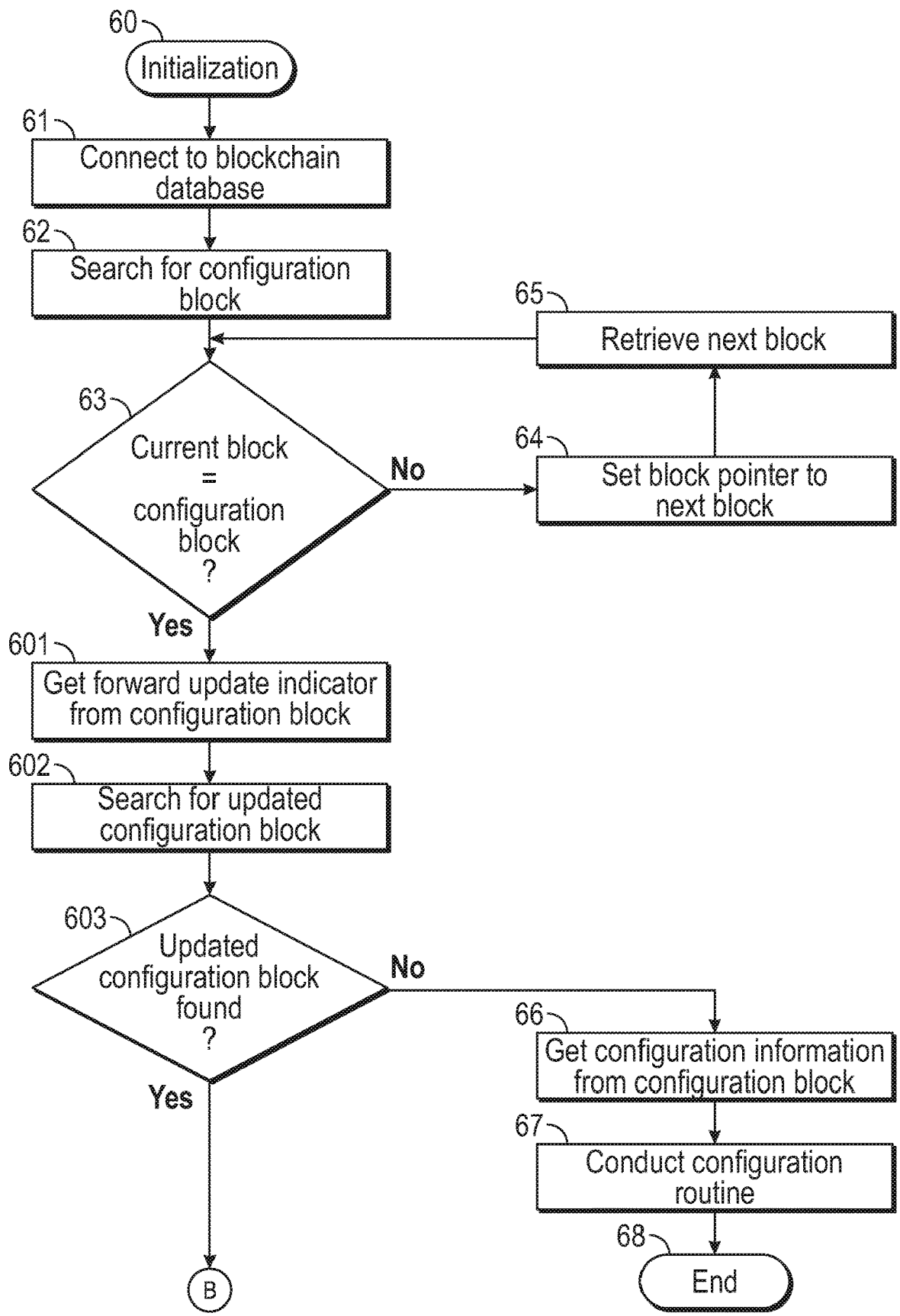
FIGS. 7A and 7B show a further embodiment of a computer-implemented method of secure configuration according to the invention in a schematic flow diagram.
Figure 7B:
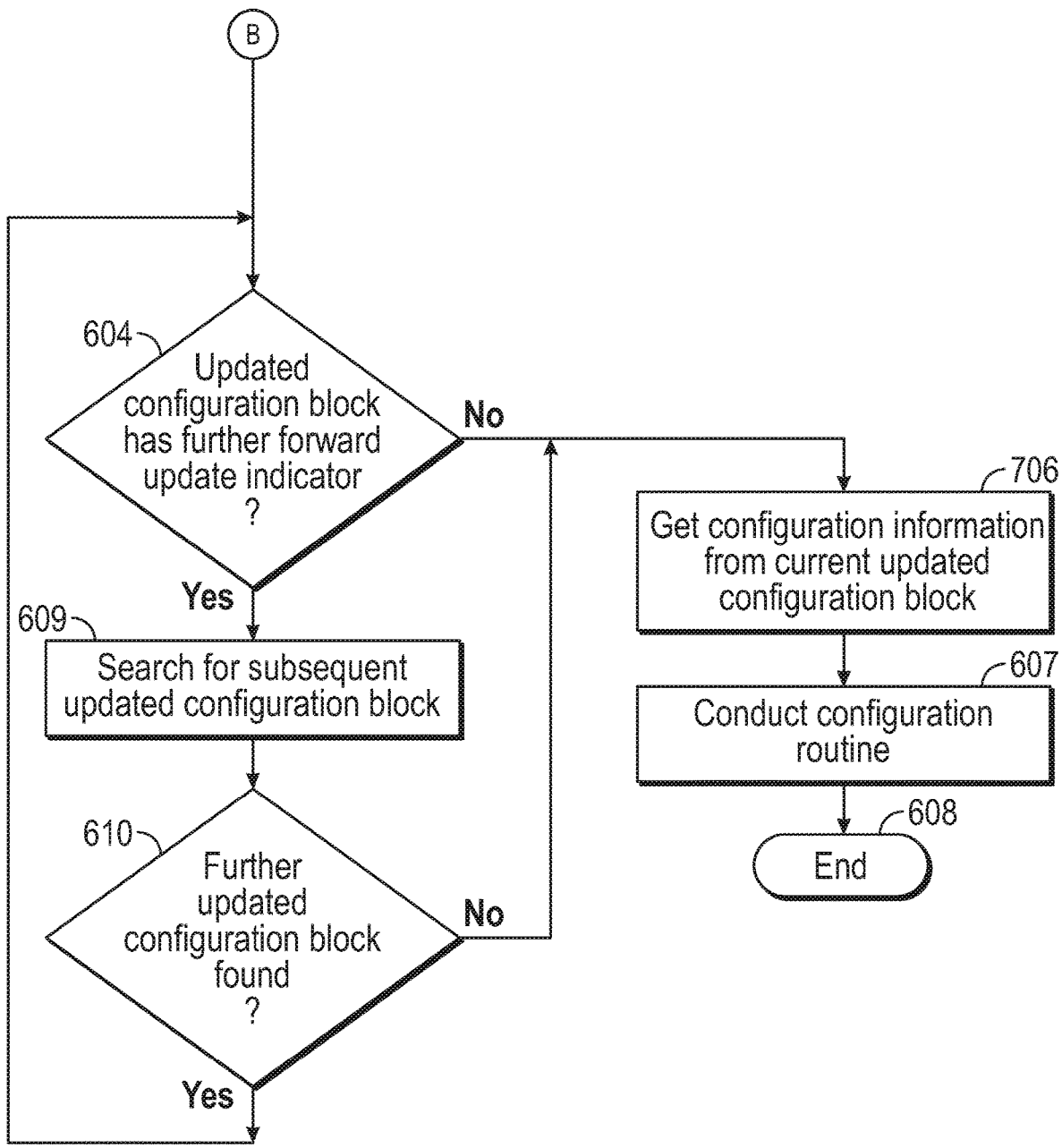

FIGS. 7A and 7B show a further embodiment of a computer-implemented method of secure configuration according to the invention in a schematic flow diagram. The embodiment corresponds to the embodiment of FIGS. 6A and 6B with the exception of the forward update indicator and that the verification, discussed in the preceding with reference to step 608, in this embodiment is conducted in conjunction with obtaining the updated configuration information from the current updated configuration block in step 706. Accordingly, a separate verification is not necessarily required in this embodiment.

The forward update indicator in the embodiment of FIG. 7 comprises a public update key of a typical private/public key pair. The manufacturer keeps the associated private update key secret.

The updated configuration information in the updated configuration block or a sufficiently long subset thereof or a sufficiently long nonce is then encrypted using the private update key. In this embodiment, the same private/public key pair can be used in all subsequent configuration blocks. Accordingly, the forward update indicator may be provided in all configuration blocks, or, to save data volume, just in the initial/original configuration block.

As will be apparent from FIG. 7, the method of the current embodiment largely corresponds to the method, explained with reference to the embodiment of FIG. 6. Accordingly, identical reference numerals have been used.

In step 706 of the current embodiment, the processing device 3 obtains the encrypted updated configuration information from the current updated configuration block. The processing device 3 then uses the public update key of one of the previous (older) configuration blocks, i.e., of the initial/original configuration block to decrypt the updated configuration information. The latter is used in case the decryption process completes successfully, otherwise the updated configuration information is discarded. The method then may proceed to step 609 to find a further updated configuration block (not shown in FIG. 7).

Other variations to the disclosed embodiments can be understood and effected by those skilled in the art in practicing the claimed invention, from a study of the drawings, the disclosure, and the appended claims. For example, it is possible to operate the invention according to an embodiment, wherein:

- the electronic device 1, instead of being a camera, being a smart device, smart (light) switch, smart light bulb, smart outlet, smart thermostat, smart fire/smoke alarm, smart CO alarm, smart heater, smart kitchen appliance, smart washer, smart dryer and/or smart heater;
- the network interface 2, instead of or in addition to being configured for using the Wi-Fi protocol, being configured to use one or more of the Bluetooth (low energy) protocol, ZigBee protocol, Z-Wave protocol, Wi-Fi protocol and any other home automation network protocol;
- the blockchain database 11, instead of corresponding to the Bitcoin blockchain, corresponds to Ethereum, Hyperledger, Sawtooth Lake, Auroracoin, Blackcoin, Burstcoin, Peercoin, Namecoin, Dogecoin, Litecoin, PotCoin, Zcash, Zcoin, ZeroVert, Zerocoin, Bytecoin, Monero, DigitalNote, Boolberry, Ubiq, Nem, Nxt, or any other suitable public or private blockchain;
- the processing device 3 is configured to connect to a first blockchain database (e.g. Bitcoin) and in case no configuration information can be obtained from said first blockchain database, the electronic device connects to at least a second blockchain database (e.g. Ethereum) to obtain the configuration information;
- instead of a random number, a random bit string (e.g., numbers or other characters) is used;
- the processing device 3 is configured to connect to multiple blockchain databases; and/or
- the block identifier, instead of comprising a time stamp (date/time) of the blockchain database 11, comprises a different unique or quasi-unique identifier.

In the claims, the words "comprising" or "having" do not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims or elsewhere should not be construed as limiting the scope.

What is claimed is:

1. A computer-implemented method of secure configuration of at least one electronic device, comprising:
   connecting to a blockchain database;
   determining from said blockchain database a configuration block comprising block identification data, where the block identification data corresponds to device identification data, stored with the electronic device; and
   obtaining configuration information and a forward update indicator from said configuration block; wherein a forward update routine is conducted, comprising:
   determining from the blockchain database, using the forward update indicator, whether an updated configuration block having updated configuration information exists;
   if the updated configuration block exists, obtaining the updated configuration information and using the updated configuration information, conducting configuration of the electronic device; and
   if the updated configuration block does not exist, conducting configuration of the electronic device using the configuration information; wherein
   in case the updated configuration block also comprises a forward update indicator, the forward update routine is conducted repeatedly, so that the at least one electronic device is configured with configuration information, comprised in a youngest or last configuration block of the blockchain database.

2. The computer-implemented method of claim 1, wherein determining the configuration block comprises determining the oldest block of the blockchain database, where the block identification data corresponds to the device identification data.

3. The computer-implemented method of claim 1, wherein determining the configuration block comprises searching for a block, where the block identification data corresponds to the device identification data.

4. The computer-implemented method of claim 1, wherein the device identification data comprises a block identifier and determining the configuration block comprises querying the blockchain database for a block, corresponding to the block identifier.

5. The computer-implemented method of claim 1, wherein a configuration pointer is stored with the electronic device and obtaining the configuration information from the configuration block comprises querying the blockchain database using the configuration pointer.

6. The computer-implemented method of claim 1, wherein a minimum block height value is stored with the electronic device and determining the configuration block comprises searching for a block, where the block identification data corresponds to the device identification data, and where said search begins from a block of the blockchain database, which corresponds to the minimum block height value.

7. The computer-implemented method of claim 1, wherein determining the configuration block comprises connecting to a blockchain search server, providing the device identification data to the blockchain search server, and receiving the configuration block.

8. The computer-implemented method of claim 1, wherein the forward update indicator comprises a public update key of a private/public update key pair and the subsequent or younger updated configuration block of the blockchain database comprises data/information that is encrypted with the private update key.

9. The computer-implemented method of claim 8, wherein the updated configuration information is encrypted with the private update key and the electronic device decrypts the updated configuration information using the public update key of a previous or older updated configuration block.

10. The computer-implemented method of claim 1, wherein the forward update indicator comprises a hash of verification data and the subsequent or younger updated configuration block of the blockchain database comprises or corresponds to the verification data.

11. The computer-implemented method of claim 10, wherein the updated configuration block(s) of the blockchain database comprises at least a further hash of further verification data.

12. The computer-implemented method of claim 1, wherein the configuration information comprises at least one or more of a configuration script, an electronic link to a configuration script, an electronic link to operating software, an electronic link to an operating software for the electronic device, an electronic link to a firmware, an electronic link to a firmware for the electronic device, an electronic link to a software update, electronic link to a software update for the electronic device, an electronic link to a configuration update, an electronic link to a configuration update for the electronic device, a hash and a signing key and/or a public key of a public key cryptography system.

13. The computer-implemented method of claim 1, wherein the method provides one or more of secure bootstrapping, secure re-configuration, and secure update of the at least one electronic device.

14. The computer-implemented method of claim 1, wherein the blockchain configuration identification information and/or the device identification data comprises at least random data.

15. The computer-implemented method of claim 1, wherein the configuration identification information and/or the device identification data comprises at least pseudo-random and/or true random data.

16. The computer-implemented method of claim 1, wherein the electronic device is an IoT device, a smart device, and/or a wireless device.

17. The computer-implemented method of claim 1, wherein the electronic device comprises at least one or more of a sensor, a camera, an actuator, a user interface, a network interface, a wireless interface, a display device, and an I/O interface.

18. The computer-implemented method of claim 1, comprising connecting to a first blockchain database and in case no configuration information can be obtained from said first blockchain database, connecting to at least a second blockchain database to obtain the configuration information.

19. A non-transitory computer-readable medium including contents that are configured to cause an electronic device to conduct the method of claim 1.

20. The method of claim 1, wherein the method is conducted by the electronic device.

21. An electronic device, comprising:
a network interface for connecting to a communications network; and
a processing device, connected with the network interface for communicating with at least one blockchain database; wherein the processing device is configured for:
connecting to a blockchain database;
determining from said blockchain database a configuration block comprising block identification data, where the block identification data corresponds to device identification data, stored with the electronic device; and
obtaining configuration information and a forward update indicator from said configuration block; wherein a forward update routine is conducted, comprising:
determining from the blockchain database, using the forward update indicator, whether an updated configuration block having updated configuration information exists;
if the updated configuration block exists, obtaining the updated configuration information and using the updated configuration information, conducting configuration of the electronic device; and
if the updated configuration block does not exist, conducting configuration of the electronic device using the configuration information; wherein
in case the updated configuration block also comprises a forward update indicator, the forward update routine is conducted repeatedly, so that the at least one electronic device is configured with configuration information, comprised in a youngest or last configuration block of the blockchain database.

* * * * *